(12) United States Patent
Baum et al.

(10) Patent No.: US 11,119,833 B2
(45) Date of Patent: Sep. 14, 2021

(54) IDENTIFYING BEHAVIORAL PATTERNS OF EVENTS DERIVED FROM MACHINE DATA THAT REVEAL HISTORICAL BEHAVIOR OF AN INFORMATION TECHNOLOGY ENVIRONMENT

(71) Applicant: Splunk Inc., San Francisco, CA (US)

(72) Inventors: Michael Joseph Baum, Ross, CA (US); R. David Carasso, San Rafael, CA (US); Robin Kumar Das, Healdsburg, CA (US); Bradley Hall, Palo Alto, CA (US); Brian Philip Murphy, London (GB); Stephen Phillip Sorkin, San Francisco, CA (US); Andre David Stechert, Brooklyn, NY (US); Erik M. Swan, Piedmont, CA (US); Rory Greene, San Francisco, CA (US); Nicholas Christian Mealy, Oakland, CA (US); Christina Frances Regina Noren, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 16/399,146

(22) Filed: Apr. 30, 2019

(65) Prior Publication Data
US 2019/0258650 A1 Aug. 22, 2019

Related U.S. Application Data

(63) Continuation of application No. 14/611,189, filed on Jan. 31, 2015, now Pat. No. 10,318,553, which is a
(Continued)

(51) Int. Cl.
*G06F 9/54* (2006.01)

(52) U.S. Cl.
CPC ............. *G06F 9/542* (2013.01); *G06F 9/54* (2013.01); *G06F 9/541* (2013.01)

(58) Field of Classification Search
CPC ............ G06F 15/18; G06F 17/30628; G06F 17/30705; G06F 17/30707; G06F 17/3071; G06F 17/30713
See application file for complete search history.

(56) References Cited

U.S. PATENT DOCUMENTS

| 5,613,113 A | 3/1997 | Goldring |
| 6,137,470 A | 10/2000 | Sundstrom et al. |

(Continued)

FOREIGN PATENT DOCUMENTS

WO 2007014268 A2 2/2007

OTHER PUBLICATIONS

Mannila et al., "Discovering Frequent Episodes In Sequences" (1995), KDD-95 Proceedings, pp. 210-215 [retrieved from https://www.aaai.org/Papers/KDD/1995/KDD95-024.pdf].*
(Continued)

*Primary Examiner* — Brian W Wathen
(74) *Attorney, Agent, or Firm* — Knobbe, Martens, Olson & Bear, LLP

(57) ABSTRACT

Methods and apparatus consistent with the invention provide the ability to organize and build understandings of machine data generated by a variety of information-processing environments. Machine data is a product of information-processing systems (e.g., activity logs, configuration files, messages, database records) and represents the evidence of particular events that have taken place and been recorded in raw data format. In one embodiment, machine data is turned into a machine data web by organizing machine data into events and then linking events together.

20 Claims, 5 Drawing Sheets

Related U.S. Application Data continuation of application No. 14/170,228, filed on Jan. 31, 2014, now Pat. No. 9,128,916, which is a continuation of application No. 13/664,109, filed on Oct. 30, 2012, now Pat. No. 8,694,450, which is a continuation of application No. 13/099,268, filed on May 2, 2011, now Pat. No. 8,589,321, which is a continuation of application No. 11/459,632, filed on Jul. 24, 2006, now Pat. No. 7,937,344.

(60) Provisional application No. 60/702,496, filed on Jul. 25, 2005.

(56) References Cited

U.S. PATENT DOCUMENTS

| Patent/Pub No. | Kind | Date | Inventor | Classification |
|---|---|---|---|---|
| 6,212,494 | B1 | 4/2001 | Boguraev | |
| 6,272,531 | B1 | 8/2001 | Shrader | |
| 6,470,384 | B1 | 10/2002 | O'Brien et al. | |
| 6,611,825 | B1 | 8/2003 | Billheimer et al. | |
| 6,658,487 | B1 | 12/2003 | Smith | |
| 6,701,305 | B1 | 3/2004 | Holt et al. | |
| 6,728,728 | B2 | 4/2004 | Spiegler et al. | |
| 6,836,894 | B1* | 12/2004 | Hellerstein | G06F 11/323 345/619 |
| 6,906,709 | B1 | 6/2005 | Larkin et al. | |
| 6,978,274 | B1 | 12/2005 | Gallivan et al. | |
| 7,607,169 | B1 | 10/2009 | Njemanze et al. | |
| 7,937,344 | B2* | 5/2011 | Baum | G06F 16/2455 706/20 |
| 7,962,483 | B1 | 6/2011 | Thomas | |
| 8,112,425 | B2 | 2/2012 | Baum et al. | |
| 8,589,321 | B2* | 11/2013 | Baum | G06F 16/316 706/20 |
| 8,661,062 | B1 | 2/2014 | Jamail et al. | |
| 8,694,450 | B2* | 4/2014 | Baum | G06F 16/2358 706/20 |
| 8,751,529 | B2 | 6/2014 | Zhang et al. | |
| 8,788,525 | B2 | 7/2014 | Neels et al. | |
| 8,806,361 | B1 | 8/2014 | Noel et al. | |
| 8,943,056 | B2* | 1/2015 | Baum | G06F 16/2358 707/736 |
| 8,954,450 | B2 | 2/2015 | Trahan et al. | |
| 9,043,717 | B2 | 5/2015 | Noel et al. | |
| 9,128,916 | B2* | 9/2015 | Baum | G06F 16/2455 |
| 9,158,811 | B1 | 10/2015 | Choudhary et al. | |
| 9,215,240 | B2 | 12/2015 | Merza et al. | |
| 9,280,594 | B2* | 3/2016 | Baum | G06F 16/24573 |
| 9,286,413 | B1 | 3/2016 | Coates et al. | |
| 9,292,590 | B2* | 3/2016 | Baum | H04L 63/1425 |
| 9,298,805 | B2* | 3/2016 | Baum | H04L 63/20 |
| 9,317,582 | B2* | 4/2016 | Baum | G06F 16/285 |
| 9,361,357 | B2* | 6/2016 | Baum | G06F 16/285 |
| 9,363,149 | B1 | 6/2016 | Chauhan et al. | |
| 9,384,261 | B2* | 7/2016 | Baum | G06F 16/2358 |
| 9,516,052 | B1 | 12/2016 | Chauhan et al. | |
| 9,848,008 | B2 | 12/2017 | Chauhan et al. | |
| 10,127,258 | B2 | 11/2018 | Lamas et al. | |
| 10,242,086 | B2* | 3/2019 | Baum | H04L 63/1425 |
| 10,318,553 | B2* | 6/2019 | Baum | G06F 16/316 |
| 10,318,555 | B2* | 6/2019 | Baum | G06F 16/2358 |
| 10,324,957 | B2* | 6/2019 | Baum | G06F 17/2785 |
| 10,339,162 | B2* | 7/2019 | Baum | G06F 16/285 |
| 2002/0069223 | A1 | 6/2002 | Goodisman et al. | |
| 2002/0174083 | A1 | 11/2002 | Hellerstein et al. | |
| 2003/0023593 | A1 | 1/2003 | Schmidt | |
| 2003/0056200 | A1 | 3/2003 | Li et al. | |
| 2003/0154396 | A1 | 8/2003 | Godwin et al. | |
| 2003/0169925 | A1 | 9/2003 | Polonowski | |
| 2003/0182310 | A1 | 9/2003 | Charnock et al. | |
| 2004/0024773 | A1 | 2/2004 | Stoffel et al. | |
| 2004/0030703 | A1* | 2/2004 | Bourbonnais | G06F 16/2379 |
| 2004/0098668 | A1 | 5/2004 | Vehkomaki | |
| 2004/0122656 | A1 | 6/2004 | Abir | |
| 2004/0167908 | A1 | 8/2004 | Wakefield et al. | |
| 2004/0215599 | A1 | 10/2004 | Apps et al. | |
| 2004/0250134 | A1 | 12/2004 | Kohler et al. | |
| 2005/0022207 | A1 | 1/2005 | Grabarnik et al. | |
| 2005/0044208 | A1* | 2/2005 | Jones | H04L 43/00 709/224 |
| 2005/0060562 | A1 | 3/2005 | Bhattacharya et al. | |
| 2005/0076067 | A1 | 4/2005 | Bakalash et al. | |
| 2005/0086188 | A1 | 4/2005 | Hillis et al. | |
| 2005/0089048 | A1 | 4/2005 | Chittenden et al. | |
| 2005/0108256 | A1 | 5/2005 | Wakefield et al. | |
| 2005/0108630 | A1 | 5/2005 | Wasson et al. | |
| 2005/0182736 | A1 | 8/2005 | Castellanos | |
| 2005/0198234 | A1 | 9/2005 | Leib et al. | |
| 2005/0222810 | A1 | 10/2005 | Buford et al. | |
| 2005/0262193 | A1 | 11/2005 | Mamou et al. | |
| 2006/0069717 | A1 | 3/2006 | Mamou et al. | |
| 2006/0101034 | A1 | 5/2006 | Murphy | |
| 2006/0167825 | A1 | 7/2006 | Sayal | |
| 2006/0174024 | A1 | 8/2006 | Chi et al. | |
| 2006/0179025 | A1 | 8/2006 | Bechtel et al. | |
| 2006/0230004 | A1 | 10/2006 | Handley | |
| 2006/0245641 | A1 | 11/2006 | Viola et al. | |
| 2006/0265406 | A1 | 11/2006 | Chkodrov et al. | |
| 2007/0022072 | A1 | 1/2007 | Kao et al. | |
| 2007/0118491 | A1 | 5/2007 | Baum et al. | |
| 2007/0234426 | A1 | 10/2007 | Khanolkar et al. | |
| 2008/0040191 | A1 | 2/2008 | Chakravarty et al. | |
| 2008/0077572 | A1 | 3/2008 | Boyle et al. | |
| 2008/0294663 | A1 | 11/2008 | Heinley et al. | |
| 2009/0199118 | A1 | 8/2009 | Sabato et al. | |
| 2009/0287630 | A1 | 11/2009 | Kaiser | |
| 2010/0229112 | A1 | 9/2010 | Ergan et al. | |
| 2011/0119100 | A1 | 5/2011 | Ruhl et al. | |
| 2011/0179017 | A1 | 7/2011 | Meyers et al. | |
| 2011/0208743 | A1 | 8/2011 | Baum et al. | |
| 2012/0290972 | A1 | 11/2012 | Yook et al. | |
| 2013/0054596 | A1 | 2/2013 | Baum et al. | |
| 2013/0097662 | A1 | 4/2013 | Pearcy et al. | |
| 2013/0227689 | A1 | 8/2013 | Pietrowicz et al. | |
| 2013/0246925 | A1 | 9/2013 | Ahuja et al. | |
| 2014/0082513 | A1 | 3/2014 | Mills et al. | |
| 2014/0092095 | A1 | 4/2014 | Higgins et al. | |
| 2014/0149438 | A1 | 5/2014 | Baum et al. | |
| 2014/0237337 | A1 | 8/2014 | Baum et al. | |
| 2015/0128267 | A1 | 5/2015 | Gupta et al. | |
| 2015/0142842 | A1 | 5/2015 | Baum et al. | |
| 2015/0143522 | A1 | 5/2015 | Baum et al. | |
| 2015/0149460 | A1 | 5/2015 | Baum et al. | |
| 2015/0154250 | A1 | 6/2015 | Baum et al. | |
| 2015/0227612 | A1 | 8/2015 | Baum et al. | |
| 2015/0227613 | A1 | 8/2015 | Baum et al. | |
| 2015/0227614 | A1 | 8/2015 | Baum et al. | |
| 2015/0293685 | A1 | 10/2015 | Chen et al. | |
| 2015/0295778 | A1 | 10/2015 | Hsiao et al. | |
| 2015/0295779 | A1 | 10/2015 | Ching et al. | |
| 2015/0295780 | A1 | 10/2015 | Hsiao et al. | |
| 2015/0295796 | A1 | 10/2015 | Hsiao et al. | |
| 2015/0317377 | A1 | 11/2015 | Baum et al. | |
| 2015/0324581 | A1 | 11/2015 | Singla et al. | |
| 2016/0156667 | A1 | 6/2016 | Baum et al. | |
| 2016/0246873 | A1 | 8/2016 | Baum et al. | |
| 2016/0255108 | A1 | 9/2016 | Baum et al. | |
| 2017/0031565 | A1 | 2/2017 | Chauhan et al. | |
| 2017/0034196 | A1 | 2/2017 | Chauhan et al. | |
| 2017/0048264 | A1 | 2/2017 | Chauhan et al. | |
| 2017/0063920 | A1 | 3/2017 | Thomas et al. | |
| 2018/0069887 | A1 | 3/2018 | Chauhan et al. | |
| 2018/0159885 | A1 | 6/2018 | Baum et al. | |
| 2018/0189328 | A1 | 7/2018 | Frazier et al. | |
| 2019/0098106 | A1 | 3/2019 | Mungel et al. | |
| 2019/0163688 | A1 | 5/2019 | Buam et al. | |
| 2019/0258649 | A1 | 8/2019 | Baum et al. | |
| 2019/0258651 | A1 | 8/2019 | Baum et al. | |

OTHER PUBLICATIONS

U.S. Appl. No. 14/611,191, Final Office Action dated Jan. 21, 2016.

U.S. Appl. No. 14/611,191, Notice of Allowance dated Mar. 4, 2016.

(56) References Cited

OTHER PUBLICATIONS

U.S. Appl. No. 14/611,228, Final Office Action dated Aug. 6, 2015.
U.S. Appl. No. 14/611,228, Final Office Action dated Dec. 17, 2015.
U.S. Appl. No. 14/691,135, Non-Final Office Action dated Jul. 23, 2015.
U.S. Appl. No. 14/691,135, Notice of Allowance dated Dec. 18, 2015.
U.S. Appl. No. 14/691,163, Non-Final Office Action dated Jul. 17, 2015.
U.S. Appl. No. 14/691,163, Non-Final Office Action dated Jul. 23, 2015.
U.S. Appl. No. 14/691,163, Notice of Allowance dated Jan. 8, 2016.
U.S. Appl. No. 14/691,195, Non-Final Office Action dated Jul. 24, 2015.
U.S. Appl. No. 14/691,195, Notice of Allowance dated Dec. 18, 2015.
U.S. Appl. No. 14/815,981, Final Office Action dated Jul. 13, 2016.
U.S. Appl. No. 14/815,981, Non-Final Office Action dated Mar. 7, 2016.
U.S. Appl. No. 14/815,981, Notice of Allowance dated Sep. 27, 2016.
U.S. Appl. No. 14/815,983, Non-Final Office Action dated Dec. 7, 2015.
U.S. Appl. No. 14/815,983, Notice of Allowance dated Mar. 14, 2016.
U.S. Appl. No. 14/815,984, Advisory Action dated Apr. 4, 2017.
U.S. Appl. No. 14/815,984, Final Office Action dated Jun. 21, 2016.
U.S. Appl. No. 14/815,984, Final Office Action dated Feb. 7, 2017.
U.S. Appl. No. 14/815,984, Final Office Action dated Jan. 26, 2018.
U.S. Appl. No. 14/815,984, Non-Final Office Action dated Feb. 16, 2016.
U.S. Appl. No. 14/815,984, Non-Final Office Action dated Sep. 26, 2016.
U.S. Appl. No. 14/815,984, Non-Final Office Action dated Jul. 28, 2017.
U.S. Appl. No. 14/815,984, Non-Final Office Action dated Jun. 26, 2018.
U.S. Appl. No. 14/815,984, Notice of Allowance dated Nov. 19, 2018.
U.S. Appl. No. 15/011,622, Advisory Action dated Jan. 12, 2018.
U.S. Appl. No. 15/011,622, Advisory Action dated Feb. 25, 2019.
U.S. Appl. No. 15/011,622, Final Office Action dated Mar. 13, 2017.
U.S. Appl. No. 15/011,622, Final Office Action dated Oct. 30, 2017.
U.S. Appl. No. 15/011,622, Final Office Action dated Nov. 23, 2018.
U.S. Appl. No. 15/011,622, Non-Final Office Action dated Sep. 1, 2016.
U.S. Appl. No. 15/011,622, Non-Final Office Action dated Jun. 28, 2017.
U.S. Appl. No. 15/011,622, Non-Final Office Action dated May 29, 2018.
U.S. Appl. No. 15/011,622, Notice of Allowance dated Mar. 27, 2019.
U.S. Appl. No. 15/011,625, Advisory Action dated Mar. 31, 2017.
U.S. Appl. No. 15/011,625, Advisory Action dated Jan. 17, 2018.
U.S. Appl. No. 15/011,625, Advisory Action dated Feb. 25, 2019.
U.S. Appl. No. 15/011,625, Final Office Action dated Jan. 18, 2017.
U.S. Appl. No. 15/011,625, Final Office Action dated Oct. 31, 2017.
U.S. Appl. No. 15/011,625, Final Office Action dated Nov. 23, 2018.
U.S. Appl. No. 15/011,625, Non-Final Office Action dated Jul. 8, 2016.
U.S. Appl. No. 15/011,625, Non-Final Office Action dated Jun. 29, 2017.
U.S. Appl. No. 15/011,625, Non-Final Office Action dated May 29, 2018.
U.S. Appl. No. 15/011,625, Notice of Allowance dated Apr. 11, 2019.
U.S. Appl. No. 15/143,566, Non-Final Office Action dated Jun. 28, 2018.
U.S. Appl. No. 15/143,566, Notice of Allowance dated Oct. 29, 2018.
U.S. Appl. No. 15/143,581, Final Office Action dated Dec. 5, 2016.
U.S. Appl. No. 15/143,581, Final Office Action dated Jan. 11, 2018.
U.S. Appl. No. 15/143,581, Non-Final Office Action dated Jul. 10, 2017.
Agichtein et al., "Mining Reference Tables for Automatic Text Segmentation" (Aug. 2004), ACM SIGKDD International Conference on Knowledge Discovery and Data Mining, pp. 20-29.
Agrawal et al., "Mining Sequential Patterns" (Aug. 6, 2002), Proceedings of 11th International Conference on Data Engineering, pp. 3-14.
Antunes et al., "Temporal Data Mining: An Overview" (2001), pp. 1-15 [retrieved from http://www.dcc.fc.up.pt/~ltorgo/AIFTSA/Proceedings/AO.pdf]. (Year: 2001).
Bounsaythip, C., et al., "Overview of Data Mining for Customer Behavior Modeling", VTT Information Technology, Research Report TTEI-2001-18, dated Jun. 29, 2001, 59 pages.
Cooley, R. et al., "Data Preparation for Mining World Wide Web Browsing Patterns", Knowledge and Information Systems 1, vol. 1, Issue 1, dated Feb. 1999, 25 pages.
Fu et al., "Mining Navigation History for Recommendation", Proceeding of the 5th International Conference on Intelligent User Interfaces, pp. 106-112, 2000 pp. 106-112.
Galassi et al., "Learning Regular Expressions From Noisy Sequences", International Symposium on Abstraction, Reformulation, and Approximation (SARA 2005), pp. 92-106, Jul. 18-21, 2007 pp. 92-106.
Gerardo et al., "Association Rule Discovery in Data Mining by Implementing Principal Component Analysis", International Conference on AI, Simulation, and Planning in High Autonomy Systems, 2005, pp. 50-60.
Han, E. et al., "Text Categorization Using Weight Adjusted k-Nearest Neighbor Classification", PAKDD, dated Mar. 20, 1999, 9 pages.
Harms et al., "Discovering Representative Episodal Association Rules From Event Sequences Using Frequent Closed Episode Sets and Event Constraints" (Aug. 7, 2002), Proceedings of the 2001 IEEE International Conference on Data Mining, pp. 603-606.
Hellerstein et al., "Discovering Actionable Patterns in Event Data", IBM Systems Journal, vol. 41, Issue 3, pp. 475-493, 2002 pp. 475-493.
Kirk, D., "Windows Notepad: Insert Time and Date Into Text or Log File", Jun. 6, 2005 pp. 1-4.
Kryszkiewicz, M., "Fast Discovery of Representative Association Rule" (Feb. 26, 1999), International Conference on Rough Sets and Current Trends in Computing, pp. 214-222.
Lee, W., "Mining in a Data-Flow Environment: Experience in Network Intrusion Detection" (1999), Proceeding of the Fifth ACM SIGKDD International Conference on Knowledge Discover and Data Mining, 1999 pp. 114-124.
Lin et al., "Efficient Adaptive-Support Association Rule Mining for Recommender Systems", Data Mining and Knowledge Discover, vol. 6, Issue 1, pp. 83-105, Jan. 2012, pp. 83-105.
Ma et al., "Mining Mutually Dependent Patterns", Proceeding of the IEEE International Conference on Data Mining, pp. 409-416, Nov. 29-Dec. 2, 2001 pp. 409-416.
Matsuo, Y., "Keyword Extraction from a Single Document Using Word Co-occurrence Statistical Information", Proceedings of the 16th International F.A.I.R.S.C., dated May 2003, 13 pages.
Pei et al., "Mining Access Patterns Efficiently from Web Logs", dated 2000, Knowledge Discovery and Data Mining Lecture Notes in Computer Science, vol. 1805, 12 pages.
Peng et al., "Mining Logs Files for Data-Driven System Management", ACM SIGKDD Explorations Newsletter—Natural Language Processing and Text Mining, vol. 7, Issue 1, pp. 44-51, Jun. 2005 pp. 44-51.
Prewett, J., "Analyzing Cluster Log Files Using Logsurfer," 12 (2003), Proceedings of the 4th Annual Conference on Linux pp. 1-12.
Rouillard, J., "Real-Time Log File Analysis Using the Simple Event Correlator (SEC)" (Nov. 2004), Proceeding of LISA pp. 1-36.
Russell, S. J., et al., "Artificial Intelligence: A Modern Approach, 2nd Edition", Pearson Education, Inc., dated 2003, 43 pages.
Soderland, S., "Learning Information Extraction Rules for Semi-Structured and Free Text" (Feb. 1999), Machine Learning, vol. 34, Issue 1-3, pp. 223-272 vol. 34, Issue 1-3, pp. 223-272.

(56) References Cited

OTHER PUBLICATIONS

Srivastava, J. et al., "Web Usage Mining, Discovery and Applications of Usage Patterns from Web Data", ACM SIGKDD Explorations Newsletter, vol. 1, issue 2, dated Jan. 2000, pp. 12-23.
Stamatatos, E. et al., "Text Genre Detection Using Common Word Frequencies", Proceedings of the 18th International Conference on Computational Linguistics, vol. 2, dated 2000, 7 pages.
Stearley, J., "Towards Informatic Analysis of Syslogs", (2004_IEEE International Conference on Cluster Computing (IEEE Cat. No. 04EX935), pp. 309-318, 2004 pp. 309-318.
Stubblebine, T., "Regular Expression Pocket Reference" (Aug. 2003), O'Reilly Media, Inc., 99 pages.
U.S. Appl. No. 11/459,632, Final Office Action dated Oct. 4, 2010.
U.S. Appl. No. 11/459,632, Non-Final Office Action dated Mar. 11, 2010.
U.S. Appl. No. 11/459,632, Notice of Allowance dated Jan. 18, 2011.
U.S. Appl. No. 13/099,268, Final Office Action dated Apr. 26, 2013.
U.S. Appl. No. 13/099,268, Notice of Allowance dated Sep. 24, 2013.
U.S. Appl. No. 14/170,228, Advisory Action dated Jan. 20, 2015.
U.S. Appl. No. 14/170,228, Non-Final Office Action dated Jul. 3, 2014.
U.S. Appl. No. 14/170,228, Notice of Allowance dated Apr. 30, 2015.
U.S. Appl. No. 14/266,831, Non-Final Office Action dated Jun. 16, 2014.
U.S. Appl. No. 14/266,831, Notice of Allowance dated Nov. 12, 2014.
U.S. Appl. No. 14/530,686, Non-Final Office Action dated Jul. 31, 2015.
U.S. Appl. No. 14/530,686, Notice of Allowance dated Jan. 13, 2016.
U.S. Appl. No. 14/611,188, Final Office Action dated Aug. 5, 2015.
U.S. Appl. No. 14/611,188, Notice of Allowance dated Dec. 30, 2015.
U.S. Appl. No. 14/611,189, Advisory Action dated Oct. 26, 2016.
U.S. Appl. No. 14/611,189, Final Office Action dated Aug. 15, 2016.
U.S. Appl. No. 14/611,189, Final Office Action dated May 26, 2017.
U.S. Appl. No. 14/611,189, Non-Final Office Action dated Apr. 11, 2016.
U.S. Appl. No. 14/611,189, Non-Final Office Action dated Nov. 25, 2016.
U.S. Appl. No. 14/611,189, Non-Final Office Action dated Oct. 10, 2017.
U.S. Appl. No. 14/611,189, Non-Final Office Action dated Sep. 28, 2018.
U.S. Appl. No. 14/611,189, Notice of Allowance dated Feb. 21, 2019.
U.S. Appl. No. 14/611,191, Final Office Action dated Aug. 10, 2015.
U.S. Appl. No. 15/143,581, Non-Final Office Action dated Jun. 26, 2018.
U.S. Appl. No. 15/143,581, Notice of Allowance dated Nov. 28, 2018.
U.S. Appl. No. 15/339,952, Non-Final Office Action dated Jul. 21, 2017.
U.S. Appl. No. 15/339,952, Notice of Allowance dated Oct. 23, 2017.
U.S. Appl. No. 15/799,906, Non-Final Office Action dated Jun. 22, 2018.
U.S. Appl. No. 15/799,906, Notice of Allowance dated Nov. 6, 2018.
Vaarandi, R., "A Data Clustering Algorithm for Mining Patterns From Event Logs" (Dec. 19, 2003), Proceedings of the 3rd IEEE Workshop on IP Operations & Management (IPOM 2003), pp. 119-126.
Witten, I. H., et al., "Data Mining: Practical Machine Learning Tools and Techniques with Java Implementations" (2000), Morgan Kaufmann Publishers, pp. 72-76, 114-118, 193-201.
World Intellectual Property Organization, Application No. PCT/US06/029019, International Search Report and Written Opinion dated Aug. 3, 2007.
World Intellectual Property Organization, Application No. PCT/US06/029019, Preliminary Report on Patentability dated Jan. 29, 2008.
U.S. Appl. No. 15/885,753, Non-Final Office Action dated Nov. 6, 2019.
Lee et al., "Data Mining Approaches for Intrusion Detection" (Jan. 26-29, 1998), Proceeding of the 7th USENIX Security Symposium, pp. 1-15 [retreived from https://usenix.org/legacy/publications/library/proceedings/sec98/full_papers/lee/lee.pdf].
U.S. Appl. No. 16/264,638, Non-Final Office Action dated Feb. 5, 2020.
U.S. Appl. No. 16/399,136, Non-Final Office Action dated Feb. 10, 2020.
U.S. Appl. No. 16/399,169, Non-Final Office Action dated Apr. 2, 2020.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.
Carraso, David, "Exploring Splunk," published by CITO Research, New York, NY, Apr. 2012.
Chabowski, "The Mainframe versus the Server Farm—A Comparison," (Apr. 24, 2017) [retrieved from https://www.suse.com/c/mainframe-versus-server-farm-comparison/].
Cooley, R. et al., "Data Preparation for Mining World Wide Web Browsing Patterns", Knowledge and Information Systetms 1, dated 1999, 25 pages.
Cooley, R. et al., "Web Usage Mining: Discovery and Application of Intertesting Patterns from Web Data," (May 2000), University of Minnesota, pp. 1-170 [retrieved from http://citeseerx.ist.psu.edu/viewdoc/download?doi=10.1.1.411.6912&rep=rep1 &type=pdf].
Han, E. et al., "Text Categorization Using Weight Adjusted k-Nearest Neighbor Classification", PAKDD, 2001, LNAI 2035, pp. 53-65 (2001) [retrieved from http://www.springerlink.com/index/25gnd0jb6nklffhh.pdf on Sep. 23, 2010].
SLAML 10 Reports, Workshop on Managing Systems via Log Analysis and Machine Learning Techniques, ;login: Feb. 2011 Conference Reports.
Splunk Enterprise 8.0.0 Overview, available online, retrieved May 20, 2020 from docs.splunk.com.
Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Tozzi, CI, "What Makes Mainframes Different? Mainframe vs. Server," (Apr. 12, 2018) [retrieved from https://blog.syncsort.com/2018/04/mainframe/mainframes-different-mainframe-vs-server/].
Wikipedia, "Mainframe Computer," (Nov. 1, 2019) [retrieved from https://en.wikipedia.org/w/index.php?title=Mainframe_comuter].
U.S. Appl. No. 12/266,831, Non-Final Office Action dated Dec. 20, 2010.
U.S. Appl. No. 12/266,831, Notice of Allowance dated May 26, 2011.
U.S. Appl. No. 13/099,268, Office Action dated Jan. 4, 2013.
U.S. Appl. No. 13/664,109, Office Action dated Jan. 4, 2013.
U.S. Appl. No. 13/664,109, Final Office Action dated Apr. 26, 2013.
U.S. Appl. No. 13/664,109, Non-Final Office Action dated Aug. 15, 2013.
U.S. Appl. No. 15/143,581, Non-Final Office Action, dated Jun. 16, 2016.
U.S. Appl. No. 15/885,753, Non-Final Office Action dated May 11, 2020.
Baum et al., U.S. Appl. No. 11/459,632, filed Jul. 24, 2006.
Baum et al., U.S. Appl. No. 13/099,268, filed May 2, 2011.
Baum et al., U.S. Appl. No. 13/664,109, filed Oct. 30, 2012.
Baum et al., U.S. Appl. No. 14/170,228, filed Jan. 31, 2014.
Baum et al., U.S. Appl. No. 14/266,831, filed May 1, 2014.
Baum et al., U.S. Appl. No. 14/530,686, filed Oct. 31, 2014.

(56) References Cited

OTHER PUBLICATIONS

Baum et al., U.S. Appl. No. 14/611,171, filed Jan. 30, 2015.
Baum et al., U.S. Appl. No. 14/611,228, filed Jan. 31, 2015.
Baum et al., U.S. Appl. No. 14/611,191, filed Jan. 31, 2015.
Baum et al., U.S. Appl. No. 14/611,189, filed Jan. 31, 2015.
Baum et al., U.S. Appl. No. 14/611,188, filed Jan. 31, 2015.
Baum et al., U.S. Appl. No. 14/691,195, filed Apr. 20, 2015.
Baum et al., U.S. Appl. No. 14/691,163, filed Apr. 20, 2015.
Baum et al., U.S. Appl. No. 14/691,135, filed Apr. 20, 2015.
Baum et al., U.S. Appl. No. 15/011,622, filed Jan. 31, 2016.
Baum et al., U.S. Appl. No. 15/011,625, filed Jan. 31, 2016.
Baum et al., U.S. Appl. No. 15/143,581, filed Apr. 30, 2016.
Baum et al., U.S. Appl. No. 15/885,753, filed Jan. 31, 2018.
Baum et al., U.S. Appl. No. 16/264,638, filed Jan. 31, 2019.
Baum et al., U.S. Appl. No. 16/399,169, filed Apr. 30, 2019.
Baum et al., U.S. Appl. No. 16/399,136, filed Apr. 30, 2019.

* cited by examiner

IDENTIFYING BEHAVIORAL PATTERNS OF EVENTS DERIVED FROM MACHINE DATA THAT REVEAL HISTORICAL BEHAVIOR OF AN INFORMATION TECHNOLOGY ENVIRONMENT

This application claims benefit as a CON of U.S. Ser. No. 14/611,189, filed Jan. 31, 2015, which claims benefit as a CON of U.S. Ser. No. 14/170,228, filed Jan. 31, 2014, which claims benefit as a CON of U.S. Ser. No. 13/664,109, filed Oct. 30, 2012, now U.S. Pat. No. 8,694,450, issued Apr. 8, 2014, which claims benefit as a CON of U.S. Ser. No. 13/099,268, filed May 2, 2011, now U.S. Pat. No. 8,589,321, issued Nov. 19, 2013, which claims benefit as a CON of U.S. Ser. No. 11/459,632, filed Jul. 24, 2006, now U.S. Pat. No. 7,937,344, issued May 3, 2011, which claims benefit of U.S. PRO Ser. No. 60/702,496, filed Jul. 25, 2005, the entire contents of the aforementioned are hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

BACKGROUND OF THE INVENTION

1. Field of the Invention

This invention relates generally to information organization and understanding, and more particularly to the organization and understanding of machine data.

2. Description of the Related Art

Information systems invariably generate vast amounts and wide varieties of machine data (e.g., activity logs, configuration files, messages, database records) whose value is widespread. Troubleshooting systems, detecting operational trends, catching security problems and measuring business performance, for example, typically require the organization and understanding of machine data. But the overwhelming volume, different and changing formats, and overall complexity of machine data create substantial difficulty for software developers, system administrators and business people who want to make sense of it and gain insight into information system behavior. The problem is compounded by the fact that information systems, and the machine data they generate, continue to grow in complexity and size.

Consider for example an information system environment for web-based applications consisting of web servers, application servers, databases and networks. Each information system component is constantly logging its own machine data documenting its activities. System administrators need to access and comprehend the machine data from one or more components to find and fix problems during operations. Security analysts want to understand patterns of machine data behavior from network devices to identify potential security threats. Business people are interested in tracing the machine data across components to follow the paths and activities customers perform when purchasing products or services.

Today, people generally attempt to comprehend information system behavior by manually looking at and trying to piece together machine data using the knowledge from one or more individuals about one or more systems. Individuals typically have specific technology domain expertise like networking, operating systems, databases, web servers or security. This expertise can also be in specific application domains like finance, healthcare, or communications. Manual approaches can be effective when considering small amounts of machine data in a single domain, but humans are easily overwhelmed as the size, variety and dynamic nature of the machine data grows.

Automated approaches, like homegrown scripts, data analysis programs, and data warehousing software, by contrast, can work with large amounts of machine data. But organizing different types of frequently changing data and formats can be troublesome, generally requiring specific methods for each type of data and necessitating modification of methods when the data formats change or new types of data are encountered. Automated approaches to building understanding from machine data are typically limited to finding simple, predefined relationships between known data elements.

Generally machine data is organized today by relying on predefined data schemas and predetermined algorithms for parsing and categorizing data. In current approaches, what data elements exist in a machine data set and how the data elements are classified generally must be known ahead of time. How the data is cleansed, parsed and categorized is defined algorithmically in advance for different types of data formats resulting in systems that are brittle, expensive to implement, and have numerous functional shortcomings. For example, unexpected types of data are typically ignored. As a result, data categorization usefulness degrades quickly and unexpected data and behaviors are not observed or recorded. Given the inherent dynamic nature of information systems and the machine data they generate, current organization methods have limited applicability.

Building understanding from machine data is inherently subjective and depends on the task, scope of data and skill level of people using a solution. Deriving specific, useful meanings from large quantities of machine data can require expertise in one or more domains and knowledge of how data from one domain relates to data from another domain. Current methods of deriving meaning from machine data are generally based on building simple pair-wise relationships (A→B) between predetermined data elements using data values. More advanced techniques may be able to find predetermined multi-data element relationships (A→B→C), provided the data elements are described in advance, requiring the availability of multiple domain experts to configure and continuously manage a solution.

Conventional methods, whether human or automated, of organizing and understanding machine data across multiple information systems and domains suffer from an inability to effectively keep up with changing machine data and are constrained by limited data relationships, making these methods difficult, time consuming, expensive and often ineffective.

There exists, therefore, a need to develop other techniques for organizing and deriving understanding from machine data.

SUMMARY OF THE INVENTION

Methods and apparatus consistent with the invention address these and other needs by turning machine data (MD) into a machine data web (MDW). A MDW is created by organizing MD into events representing discrete activities, and dynamically linking events together representing larger, more complex activities. Much like the World Wide Web is a hyperlinked information space of documents and web sites. A MDW is an interconnected information space of information system events and activities. The MDW can be searched, browsed, navigated, and analyzed as a proxy for the information-processing environment itself. Unlike the WWW's HTML documents and hyperlinks, however, the events organized from machine data, and the links between these events, do not generally exist and must be manufactured through the processing and analysis of MD.

In one implementation, MD is organized into events using a collection of techniques including, but not limited to, aggregating a MD collection into discrete events, extracting important entities from an event's data, segmenting an event's data into tokens, and classifying events into like categories. An important aspect is the ability to continuously learn and adapt, keeping up with changes in the MD. In the example of a web-based application information system environment, data sources and data formats can be constantly changing. For example, new web servers and network components can be added and old ones removed as the application requires more capacity or reconfiguration.

In another aspect, knowledge or understanding is built from the organized MD as events are connected to one another by dynamically constructing links using a number of techniques, including but not limited to the analysis of event data values, timing, patterns, and statistics. One advantage of the MDW is that it can learn new types of links as they occur and build paths by chaining multiple links together. Another advantage is the ability to preserve integrity by reconstructing the original MD from the MDW events. Dynamic construction of links and paths through multiple machine data sources enables a system administrator working on a web-based application information system to follow the sequence of activities from the web server to the application and eventually the database in order to locate the source of a problem.

BRIEF DESCRIPTION OF THE DRAWINGS

The invention has other advantages and features which will be more readily apparent from the following detailed description, when taken in conjunction with the accompanying drawings.

DETAILED DESCRIPTION OF THE PREFERRED EMBODIMENTS

Figure 1:
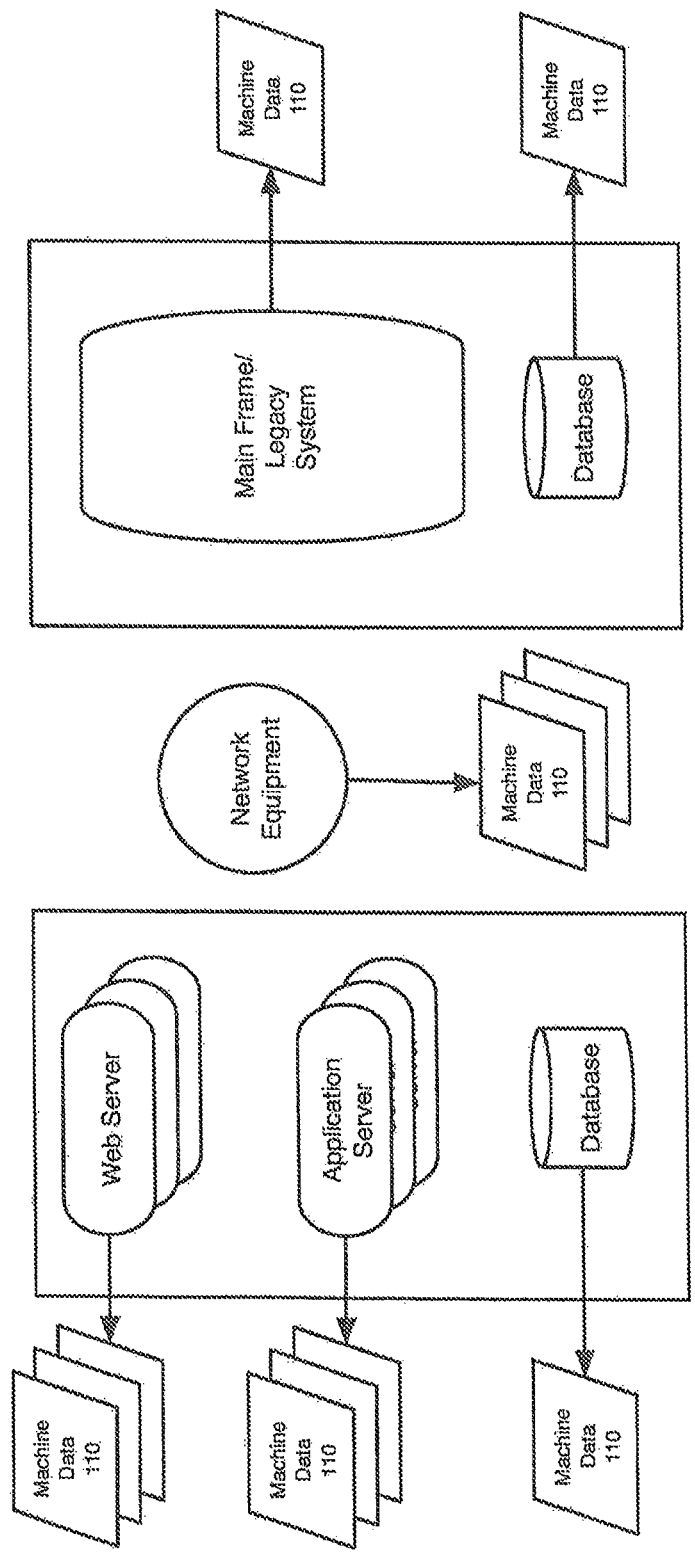
FIG. 1 is a diagram an example information-processing environment suitable for use with an MDW.

In the example of FIG. 1, the information-processing environment includes hardware and software components such as computers, routers, databases, operating systems and applications in a distributed configuration for processing information. Each component may be producing MD 110, and there may be many MD sources and large quantities of MD across multiple technology and application domains. For example, a computer may be logging operating system events, a router may be auditing network traffic events, a database may be cataloging database reads and writes or schema changes, and an application may be sending the results of one application call to another across a message queue. In this embodiment, individual IT personnel—who may reside in different data centers, companies, or even geographies—typically manage specific technology and application domains. Aspects of the invention will be described with respect to the information-processing environments in FIG. 1, but the invention can also be used with other information-processing environments.

Figure 2:
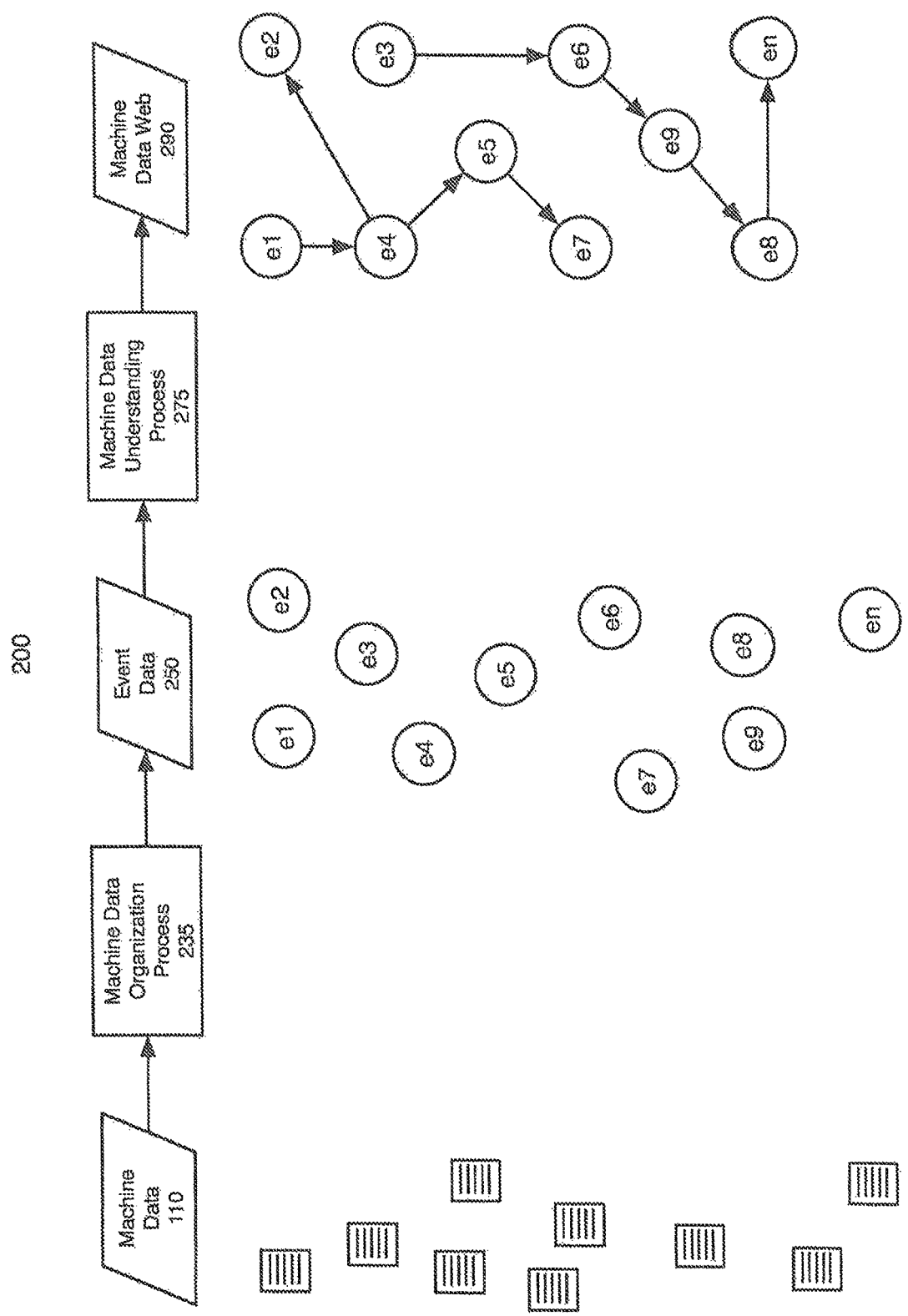
FIG. 2 is a flow diagram of one example of creation of an MDW according to the invention.

FIG. 2 represents one approach 200 to building a MDW 290 from MD 110. This approach includes an organization process 235 and an understanding process 275. During the organization process 235, the MD 110 is organized into collections of discrete events 250, referred to herein as event data (ED). Events 250 represent units of system activity. Examples of events 250 include, for example, a web server servicing an HTTP "get" request from a web browser, an application server servicing an API call, or a database updating records in a table. Collections of events 250 can describe larger system activities, such as an attempt to update a customer record or submit an order. One of the challenges in organizing 235 MD 110 into events 250 is that MD generally has little formal structure and typically includes not much more than a time stamp common across different sources of MD and different types of events. MD 110 is also subject to changes in environment configurations. For example, changing the verbosity level in a web server configuration file can dramatically increase or decrease the amount of information included in an HTTP "get" event found in the web server's log file.

During the understanding process 275, ED 250 is analyzed to create dynamic links between events and build the MDW 290. As an example, consider that a log from a web server may contain specific types of events 250 with specific event data, but a log from an application server or database may contain different events 250 and event data specific to its own domain. A system administrator may, for example, locate the web server event by looking for a session ID found in a web server log, locate the application server event by finding a process ID in the message queue, and locate a database table update event by searching for a transaction ID in the database audit trail. All three sources may contain events 250 that are part of a larger system activity, yet there is no obvious or explicit common structure or data shared among the MD 110 produced by each system. Common structure is manufactured across the three sources by analyzing the event data 250 so that connections between events can be identified. In one implementation, patterns of event behavior are recorded in real-time and identified, for example, as frequently occurring or infrequently occurring. Frequent patterns identify typical system processes and well-known links Infrequent patterns identify deviations or anomalies and less well-known links. Contrast this with the world of the web, where hyperlinks are part of the formal, common structure of HTML—the language for building most web pages. Building links by hand for large volumes of ED 250 is not an option for complex information-processing environments.

Machine Data Organization Process

Figure 3:
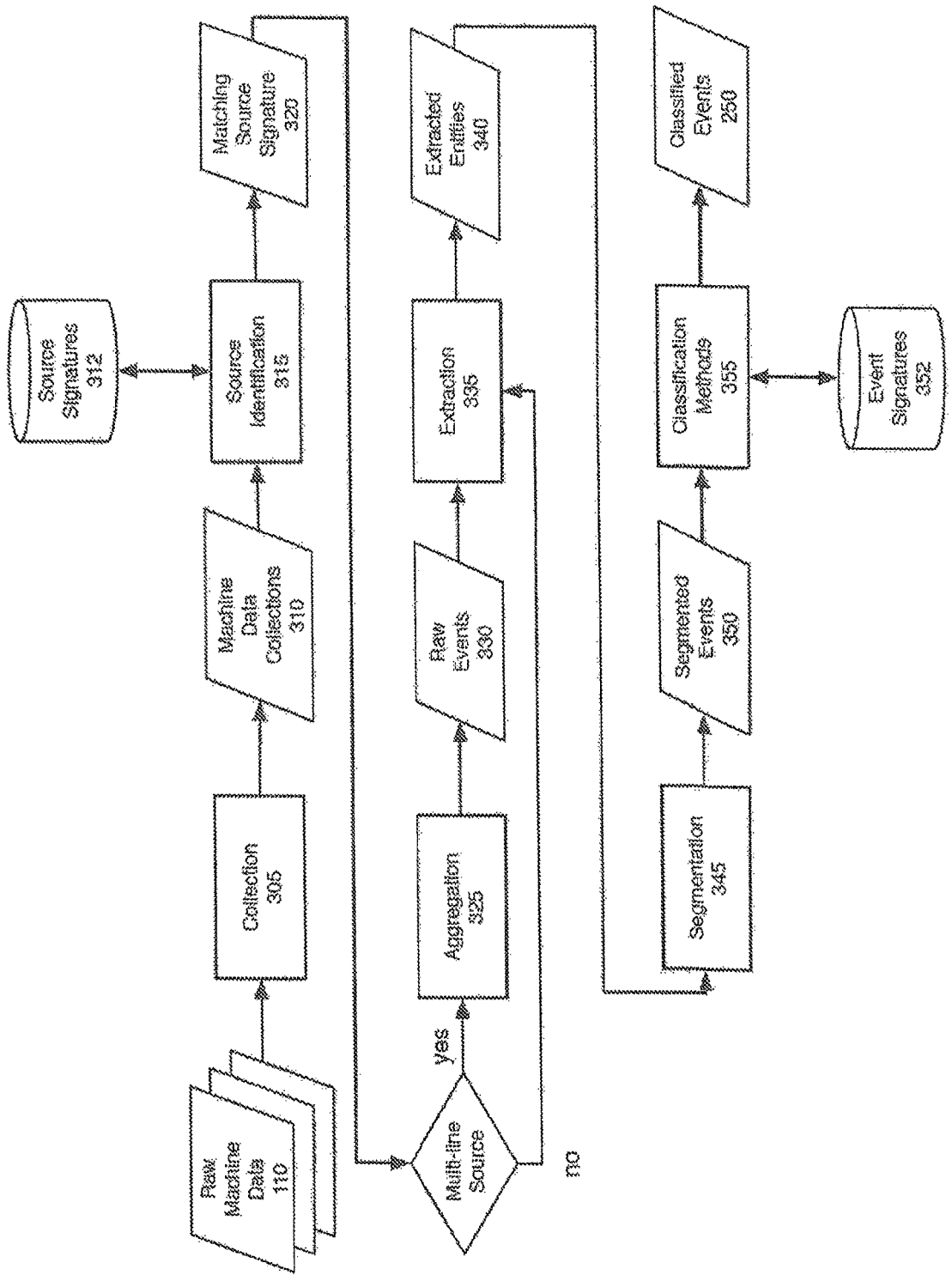
FIG. 3 is a flow diagram of one example of MD organization according to the invention.

FIG. 3 is a flow diagram of one implementation 235 of the MD organization process of FIG. 2. In this implementation, there are several steps including collection 305, source identification 315, aggregation 325, extraction 335, segmentation 345, and classification 355. Through these steps, MD 110 is collected from the information-processing environment and organized into ED 250 for the MD understanding process. For convenience, the technology that implements each step will be referred to as a module. That is, the "collection module" is the technology that collects MD. In one implementation, the modules are all implemented as software.

Collection

In the collection step 305, the MD 110 may be collected directly from its original source or consolidated over a number of sources. Machine data 110 can, and often does, arrive out of order. Collection 305 of MD 110 can be performed based on standard approaches to data access, for example, reading log files, examining message bus traffic, becoming a sync for logging systems like Syslog, or connecting to database auditing systems. Parts of the collection module can be situated in different locations, preferably with access to the MD 110.

Source Identification—Classification into Domains

Given the repetitive, yet dynamic, nature of MD 110, an effective organization process 235 (such as shown in FIG. 3) preferably will learn about data formats and structure automatically. In one implementation, learning is separated into different domains based on the source of MD 110. Domains can be general system types, such as log files, message bus traffic, and network management data, or specific types, such as output of a given application or technology—Sendmail logging data, Oracle database audit data, and J2EE messaging. An MDW can include a mix of general domains and specific domains.

In this example organization process 235, the domain for a given source of MD is identified 315 so that domain specific organization methods can be applied. Domains are determined through a learning process. The learning process uses collections of MD from well-known domains as input and creates a source signature 312 for each domain. In one implementation, source signatures 312 are generated from representative samples of MD 110 by creating a hash table mapping punctuation characters to their frequency. While the tokens and token values can change in a MD collection, in this particular implementation, the signature 312 generated by the frequency of punctuation is quite stable, and reliable within a specific domain. Other implementations could use functions of the punctuation and tokens, such as the frequencies of the first punctuation character on a line, or the first capitalized term on a line. Given that source signatures 312 can be large and hard to read, signatures can have a corresponding label in the form of a number or text that can be machine generated or human assigned. For example, the source signature 312 for an Apache web server log might be programmatically assigned the label "205", or a user can assign the label "Apache Server Log".

In one embodiment, clustering is used to classify 315 collected MD 110 into domains according to their source signatures 312. As collections of MD 110 are encountered, each collection's signature is matched to the set of known source signatures 312 by performing a nearest-neighbor search. If the distance of the closest matching signature 312 is within a threshold, the closest matching signature 320's domain is assumed to be the domain of the source. If no best match can be found, a new source signature 312 can be created from the sample signature and a new source domain created. Alternatively, a default source domain can be used. In one implementation, the distance between two signatures is calculated by iterating over the union of attributes of the two signatures, with the total signature distance being the average of distances for each attribute. For each attribute A, the value of A on Signature1 and Signature2, V1 and V2, are compared and a distance is calculated. The distance for attribute A is the square of (V1-V2)*IDF, where IDF is the log(N/|A|), where N is the number of signatures, and |A| is the number of signatures with attribute A.

Source Identification—Classification as Text/Binary

Some MD 110 sources are non-textual or binary and cannot be easily processed unless a known process is available to convert the binary MD into textual form. To classify a source as textual or binary, a sample MD collection is analyzed. Textual MD can also have embedded binary MD, such as a memory dump, and the classification preferably identifies it as such. In one implementation, the textual/binary classification works as follows. The sample is a set of lines of data, where a line is defined as the data between new lines (i.e., '\n'), carriage-returns (i.e., '\r'), or their combination (i.e., '\r\n'). For each line, if the line's length is larger than some large threshold, such as 2 k characters, or if the line contains a character with an ASCII value of zero (0), a count of Binary-looking lines is incremented. Otherwise, if the line's length is shorter than a length that one would expect most text lines to be below, such as 256 characters, a count of Text-looking lines is incremented. If the number of Text-looking lines is twice as numerous as the Binary-looking lines (other ratios can be used depending on the context), the source is classified as text. Otherwise, the source is classified as binary.

Aggregation of Machine Data into Raw Events

When the source signature 320 for a collection of MD has been identified 315, the corresponding aggregation rules are applied 325 to the MD collection. Aggregation rules describe the manner in which MD 110, from a particular domain, is organized 325 into event data 330 by identifying the boundaries of events within a collection of MD, for example, how to locate a discrete event by finding its beginning and ending. In one implementation, the method of aggregation 325 learns, without prior knowledge, by grouping together multiple lines from a sample of MD 110. Often MD 110 contains events 330 that are anywhere from one to hundreds of lines long that are somehow logically grouped together.

The MD collection may be known a priori, or may be classified, as single-line type (i.e., containing only single-line events) or multi-line type (i.e., possibly containing multi-line events) prior to performing aggregation. For those MD collections that are classified as single-line type, aggregation 325 is simple—single-line type MD collections are broken on each line as a separate event. Multi-line type MD collections are processed 325 for aggregation. In one implementation, a MD collection is classified as a multi-line type if 1) there is a large percentage of lines that start with spaces or are blank (e.g., if more than 5% of the lines start with spaces or are blank), or 2) there are too many varieties of punctuation characters in the first N punctuation characters. For example, if the set of the first three punctuation characters found on each line has more than five patterns (e.g., ':::', '!:!', ',,,', ':..', '( )*'), the collection might be classified as multi-line.

Another aspect of aggregation methods 325 is the ability to learn, and codify into rules, what constitutes a break between lines and therefore the boundary between events, by analyzing a sample of MD. For example, in one implementation, an aggregation method 325 compares every two-line pair looking for statistically similar structures (e.g., use of white space, indentation, and time-stamps) to quickly learn which two belong together and which two are independent. In one implementation, aggregation 325 works as follows. For each line, first check if the line starts with a time-stamp. If so, then break. Typically, lines starting with a time-stamp are the start of a new event. For lines that do not start with a time-stamp, combine the current line with the prior line to see how often the pair of lines occurs, one before the other, as a percentage of total pairs in the MD sample. Line signatures are used in place of lines, where a line signature is a more stable version of a line, immune to simple numeric and textual changes. In this implementation, signatures can be created by converting a line into a string that is the concatenation of leading white space, any punctuation on the line, and the first word on the line. The line "10:29:03 Host 191.168.0.1 rebooting:normally" is converted to "::..: Host."

Now this current line signature can be concatenated with the previous line signature (i.e., signature1 combined with signature2) and used as a combined key into a table of break rules. The break rule table maps the combined key to a break rule, which determines whether there should be a 'break', or not, between the two lines (i.e., whether they are part of different events or not). Break rules can have confidence levels, and a more confident rule can override a less confident rule. Break rules can be created automatically by analyzing the co-occurrence data of the two lines and what percent of the time their signatures occur adjacently. If the two line signatures highly co-occur, a new rule would recommend no break between them. Alternatively, if they rarely co-occur, a new rule would recommend a break between them. For example, if line signature A is followed by line signature B greater than 20% of the time A is seen, then a break rule might be created to recommend no break between them. Rules can also be created based on the raw number of line signatures that follow/proceed another line signature. For example, if a line signature is followed by say, ten different line signatures, create a rule that recommends a break between them. If there is no break rule in the break rule table, the default behavior is to break and assume the two lines are from different events. Processing proceeds by processing each two-line pair, updating line signature and co-occurrence statistics, and applying and learning corresponding break rules. At regular intervals, the break rule table is written out to the hard disk or permanent storage.

Extraction of Entities

Following aggregation 325 and before event segmentation 345, various extraction methods 335 can be applied to identify semantic entities 340 within the data. In one implementation, search trees or regular expressions can be applied to extract and validate, for example, IP addresses or email addresses. The goal of extraction 335 is to assist the segmentation process 345 and provide semantic value to the data.

Segmentation of Events

Segmentation 345 rules describe how to divide event data 330 into segments (also known as tokens 350). It is important to note at this point that segments 350 have little semantic value, unless an extracted entity 340 has been applied. In one implementation a segmentation rule 345 examines possible separators or punctuation within the event 330, for example, commas, spaces or semicolons. An important aspect of segmentation 345 is the ability to not only identify individual segments 350, but also to identify overlapping segments 350. For example, the text of an email address, "bob.smith@corp.com", can be broken 345 into individual and overlapping segments 350; <bob.smith>, <@>and <corp.com>can be identified as individual segments, and «bob.smith><@><corp.com» can also be identified as an overlapping segment. In one implementation, segmentation 345 uses a two-tier system of major and minor breaks. Major breaks are separators or punctuation that bound the outer most segment 350. Examples include spaces, tabs, and new lines. Minor breaks are separators or punctuation that break larger segments 350 into sub segments 350, for example periods, commas, and equal signs. In one implementation, more complex separators and punctuation combinations are used to handle complex segmentation tasks 345, for example handling Java exceptions in an application server log file.

Classification of Event Types

In the embodiment of FIG. 3, the final step of the organization process 235 is the classification 355 of events 350 into event types. Examples of event types include a web server HTTP "get," an application server database "connect," or an email server "send mail attempt." In one implementation, an event signature 352 is generated for each event type. One method for generating an event signature 352 is to build a hierarchical scheme for identifying particular types of events based on the overall event structure 330, segmentation 350, segment values 350, and extracted entities 340. The purpose of the event signature 352 is to identify a type of event regardless of the situation. In this way a particular type of event can have the same signature 352 in multiple MDWs. For example, a mail server's send mail attempt generally has the same signature 352 in every MDW regardless of the information-processing environment.

In one implementation a hierarchical event signature {v1, v2, v3, ... vn} 352 is constructed from a list of successively more specific hash functions {f1 ( ) 120, f3( ), ... fn( )}, where each fn( ) produces a value representing a level of the hierarchy. The event signature 352 is most useful when each successive function is more specific. For example, in one embodiment, the following function list represents a 9 level event signature 352, from most general to most specific:

f1( ): firstCharType—returns alpha, numeric, white space, other, depending on the type of the first character of the event.

f2( ): headwhitespace—returns the number of spaces/tabs at the beginning of the event.

f3( ): firstpunc—returns the first punctuation character of the event.

f4( ): firstImportantKeywords—returns a hash value of first word in the event that is an important keyword, where there is a list of known important terms.

f5( ): firstKnownWord—returns the first word in the event that is a known keyword, where there is a list of known terms.

f6( ): importantKeywords returns the list of all hash values of important keywords that are found in the event.

f7( ): firstUnknownWord—returns the first word in event that is not a known keyword.

f8( ): headPunc—returns the first 10 punctuation characters in the event, removing duplicates.

f9( ): allPunc—returns all punctuation in event.

In this implementation, the event signature 352 is a traversal through a hierarchy of possible values. Given that event signatures 352 can be large and hard to read, an event signature can have a corresponding label in the form of a number or text that can be machine generated or human assigned. For example, an email server "send mail attempt" event might be programmatically assigned the label "500", but a user can assign the label "send mail attempt".

Machine Data Understanding Process

Figure 4:
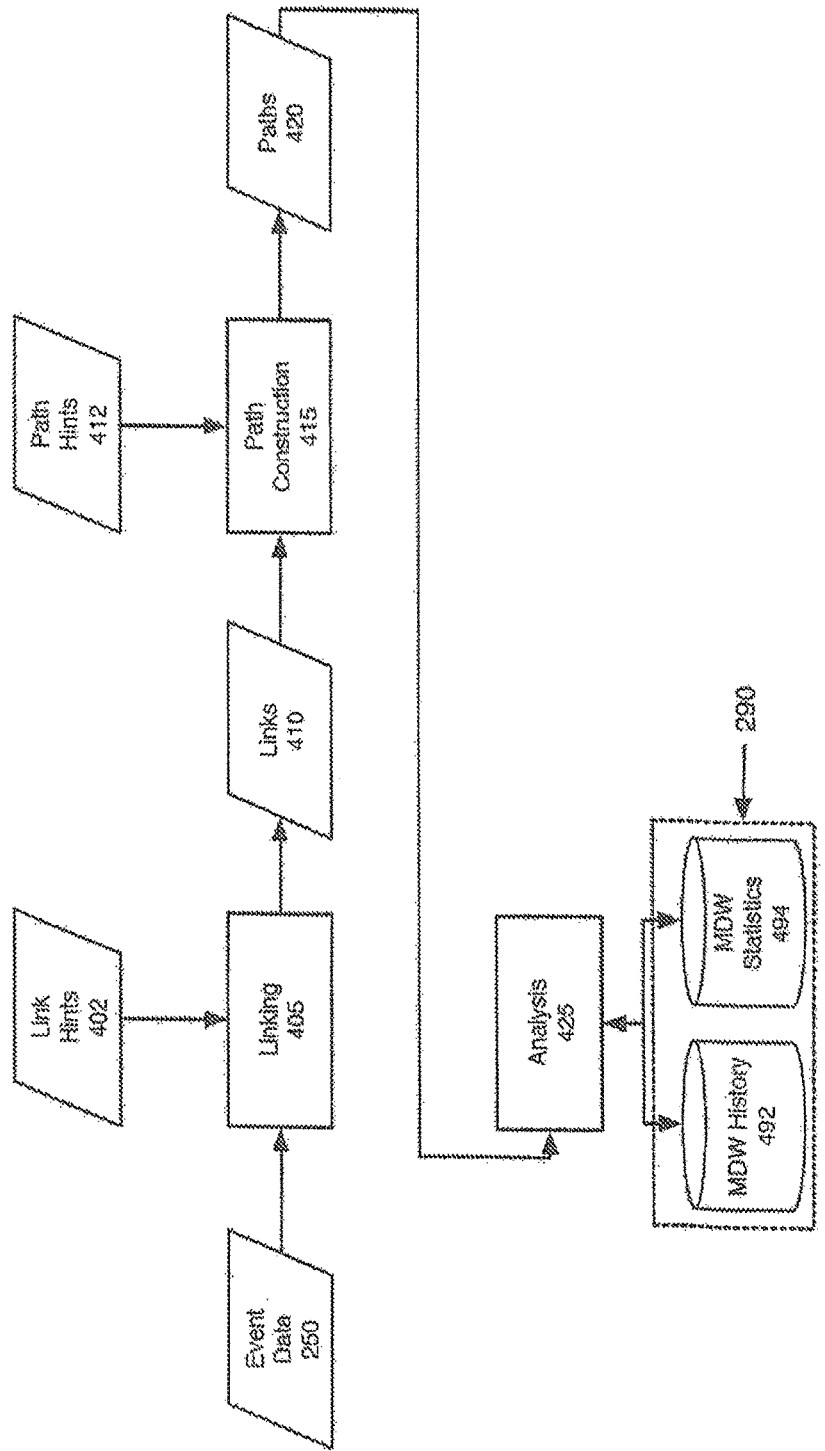
FIG. 4 is a flow diagram of one example of MD understanding according to the invention.

FIG. 4 is a flow diagram of one implementation 275 of the MD understanding process shown in FIG. 2. During the understanding process 275, knowledge about how events relate to one another is discovered from the event data 250. This knowledge is valuable in understanding the behavior of the underlying information-processing environment. Links 410, representing relationships between events 250 are useful, among other things, for finding connections and causality where little or no common structure exists. For example, in an email-messaging information-processing environment, an event 250 may exist in the message transfer agent (MTA) indicating the receipt of a message from a sender, another event 250 may exist in the spam filtering software documenting that the sender is known and the message is safe to forward to a user's mailbox, and finally the mailbox authentication may contain an event 250 showing that the user attempted to login to their mailbox and retrieve their mail. These three events 250 may contain no common structure other than a timestamp. However, the three events 250 are connected as part of a larger email messaging activity. In one implementation of the understanding process 275, several techniques are applied including linking 405, which creates connections 410 between events 250; path construction 415, to build more complex, multi-link connections 420; and analysis 425, which records historical data 492 and generates statistics 494 about the MDW.

Linking Events

By analyzing event data 250 and possible link hints 402 from external systems or human input, links 410 can be created 405. An important feature of the MDW approach is the ability to create 405 link relationships 410 dynamically and learn new possible link relationships on the fly. A number of methods can be used in the analysis of ED 250 to create 405 links 410, including, but not limited to, value analysis, statistical analysis, timing analysis, and the evaluation of link hints 402. These methods can be used individually or in combination with one another. From our previous example, perhaps the link 410 between the MTA and the spam filter events 250 is a value association between the MTA message ID and the spam filter article ID, or the link 410 between the spam filter and the user email retrieval 250 is an associative mail box name. All three events 250 might be tied together, for example by observing a timing pattern that occurs over and over again with statistically relevant frequency.

In one implementation, link analysis 405 takes place by creating a co-occurrence table with an entry for pairs of event types or event data values that occur within a predetermined window of each other. In one aspect, windows are bounded by a window threshold taking the form of time (e.g. 10 minutes), event types (e.g. 50 unique event types), or event instances (e.g. 1000 events). The value of the co-occurrence table entry is the distance between the pair (time, event types, or event instances). Pairs that co-occur often enough, and meet a distance standard deviation threshold are deemed relevant and reliable links. For example, assume that an event 250 of type A occurred 50 times, an event of type B occurred 40 times, an event of type A was followed by an event of type B 20% of the time, and the standard deviation of their distance was less than 5.0 (a predetermined threshold), then a link 410 is created between events 250 of type A and type B (represented as A→B). Standard deviation thresholds are based on a function of window thresholds and may change based on the time to complete analysis or the number of desired results. Window thresholds may change based on data density and time available to complete the analysis.

Path Construction by Chaining Linked Events

Paths 420 are multi-link collections representing a chain of linked events 410. Paths 420 often represent a higher level of information system behavior, possibly spanning multiple systems, applications or data centers. Paths 420 are useful, for example, for following more complex activities or transactions through one or more systems. In our email example, a path 420 could be the receiving or sending of an email including three or more events 250 and two or more links 410. Similar to links 410, paths 420 are created 415 by analyzing event data 250,410 and possible path hints 412 from external systems or human input. An important feature is the ability to create paths 420 dynamically and learn new possible paths on the fly.

Paths 420 are built by chaining together 415 event links 410, using a number of methods. In one implementation, paths 420 are discovered as chains of transitive links 410. For example, given previously discovered links 410 A→B, B→C, A→C, and C→A, transitively composition yields the following three event paths 420: A→B→C, B→C→A, A→C→A, C→A→B and C→A→C. These paths 420 can also be combined to make larger and larger path chains. In one aspect, certain restrictions are applied 415 to reduce combinatorial explosion. One restriction might involve the elimination of cycles and repetitions. For example, one rule 415 might be that A→C and C→A cannot be combined to create A→C→A. In a second possible restriction 415, for A→B and B→C to be combined there must be an A→C link 410, with the average distance of A→C being approximately equal to the sum of the average distances between A→B and B→C. In addition, the standard deviation of the distance for A→C must be approximately equal to the standard deviations of A→B and B→C. Finally, paths 420 that are rotations of other paths can be removed, keeping the most reliable path. For example, given paths 420 A→B→C and C→A→B, if the standard deviation of the distance between C→A is greater than the standard deviation of the distance between B→C then A→B→C would be kept and C→A→B removed.

Like the WWW and HTML hyperlinks, event links 410 and paths 420 can be represented as a uniform resource locator (URL). In one implementation a link 410 from one event 250 to another is represented by the following URL "mdw://<name of MDW>/<link type>/<link value>/<event 1>/event<2>." A link 410 can resolve to one of several destinations including, but not limited to an event type, an event instance or an event segment within an event instance.

Analysis of the MDW

In addition to links 410 and paths 420, another aspect of the MDW understanding process 275 is the ability to generate 425 historical information 492 about itself, for example, statistics 494 for event, event type, link or path occurrences. One aspect of historical data 492 regarding the MDW is that it can reveal historical behavior of the information-processing environment itself.

Accessing the MDW

Figure 5:
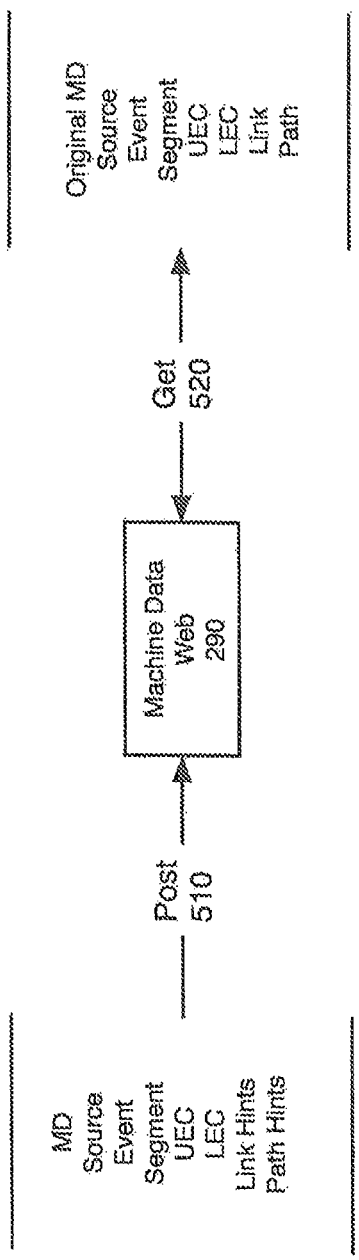
FIG. 5 is a diagram illustrating access to an MDW.

FIG. 5 refers to one approach to access the elements of the machine data web 290, including its data and dynamic relationships, through an application-programming interface (API). In one embodiment, the MDW 290 and corresponding technology infrastructure is Internet-based. The API includes commands to post data 510 to the MDW infrastructure 290 including, but not limited to, MD, events, segments, source signatures, link hints, and path hints. In the same embodiment, the API also includes commands to get data 520 from the MDW 290 including, but not limited to, the original MD, events, segments, source signatures, links, and paths. Utilizing the MDW API, a variety of applications and systems can take advantage of an advanced organization and understanding of machine data.

The MDW can be implemented in many different ways. In one approach, each box in FIGS. 2, 3 and 4 is implemented in software as a separate process. All of the processes can run on a single machine or they can be divided up to run on separate logical or physical machines. In alternate embodiments, the invention is implemented in computer hardware, firmware, software, and/or combinations thereof. Apparatus of the invention can be implemented in a computer program product tangibly embodied in a machine-readable storage device for execution by a programmable processor. Method steps of the invention can be performed by a programmable processor executing a program of instructions to perform functions of the invention by operating on input data and generating output. The invention can be implemented advantageously in one or more computer programs. Each computer program can be implemented in a high-level procedural or object-oriented programming language or in assembly or machine language if desired; in any case, the language can be a compiled or interpreted language. Any of the foregoing can be supplemented by, or incorporated in, ASICs (application-specific integrated circuits) and other forms of hardware.

Although the detailed description contains many specifics, these should not be construed as limiting the scope of the invention but merely as illustrating different examples and aspects of the invention. It should be appreciated that the scope of the invention includes other embodiments not discussed in detail above. For example, not all of the steps shown are required in every implementation, and they may be implemented in ways other than the examples given above. The order of the steps may also be changed in certain cases. Various other modifications, changes and variations which will be apparent to those skilled in the art may be made in the arrangement, operation and details of the method and apparatus of the present invention disclosed herein without departing from the spirit and scope of the invention.

What is claimed is:

1. A method, comprising:
receiving first machine data, the first machine data reflecting activity in an information technology environment;
generating signatures from portions of the first machine data;
receiving second machine data, the second machine data reflecting activity in the information technology environment;
identifying sources of the second machine data using the signatures generated from the portions of the first machine data, wherein the sources include a first computing device associated with a first signature of the signatures and a second computing device associated with a second signature of the signatures;
determining a first event from the second machine data based at least in part on the first signature, wherein the first event is associated with the first computing device;
determining a second event from the second machine data based at least in part on the second signature, wherein the second event is associated with the second computing device;
determining a behavioral pattern in real time between the first event and the second event based on a co-occurrence of the first event and the second event within a time window;
determining historical behavior of the information technology environment based at least in part on the determined behavioral pattern; and
sending at least a portion of the determined historical behavior to a computing system;
wherein the method is performed by one or more computing devices.

2. The method as recited in claim 1, wherein the behavioral pattern is a first behavioral pattern, the method further comprising determining an association between the first behavioral pattern and a second behavioral pattern, wherein the second behavioral pattern is between a third event from the second machine data and a fourth event from the second machine data, wherein the association between the first behavioral pattern and the second behavioral pattern corresponds to the determined historical behavior, wherein the determining the association between the first behavioral pattern and the second behavioral pattern comprises:
identifying a timing pattern between the first behavioral pattern and the second behavioral pattern.

3. The method as recited in claim 1, wherein the behavioral pattern is a first behavioral pattern, the method further comprising determining an association between the first behavioral pattern and a second behavioral pattern between a third event from the second machine data and a fourth event from the second machine data, wherein the association between the first behavioral pattern and the second behavioral pattern corresponds to the determined historical behavior, wherein the determining the association between the first behavioral pattern and the second behavioral pattern comprises:
identifying a timing pattern between the first behavioral pattern and the second behavioral pattern; and
measuring a statistical frequency of the timing pattern.

4. The method as recited in claim 1, wherein the behavioral pattern is a first behavioral pattern, the method further comprising determining an association between the first behavioral pattern and a second behavioral pattern between a third event from the second machine data and a fourth event from the second machine data, wherein the association between the first behavioral pattern and the second behavioral pattern corresponds to the determined historical behavior, wherein the determining the association between the first behavioral pattern and the second behavioral pattern comprises:
identifying a timing pattern between the first behavioral pattern and the second behavioral pattern;

measuring a statistical frequency of the timing pattern; and determining that the first behavioral pattern and the second behavioral pattern are associated based on the statistical frequency of the timing pattern.

5. The method as recited in claim 1, wherein a first portion of the second machine data that is produced from the first computing device has a different data format than a second portion of the second machine data produced from the second computing device.

6. The method as recited in claim 1, wherein determining the first event and determining the second event comprises:

analyzing the second machine data in order to segment the second machine data into the first event associated with the first computing device and the second event associated with the second computing device by determining a beginning and an ending of each of the first event and the second event, each of the first event and the second event including a portion of the second machine data segmented for that event.

7. The method as recited in claim 1, further comprising:

analyzing the second machine data in order to segment the second machine data into the first event associated with the first computing device and the second event associated with the second computing device by determining a beginning and an ending of each of the first event and the second event, each of the first event and the second event including a portion of the second machine data segmented for that event; and associating a time stamp with each of the first event and the second event, the time stamp derived from second machine data segmented for that event.

8. One or more non-transitory computer-readable storage media, storing one or more sequences of instructions, which when executed by one or more processors cause the one or more processors to:

receive first machine data, the first machine data reflecting activity in an information technology environment;

generate signatures from portions of the first machine data;

receive second machine data, the second machine data reflecting activity in the information technology environment;

identify sources of the second machine data using the signatures generated from the portions of the first machine data, wherein the sources include a first computing device associated with a first signature of the signatures and a second computing device associated with a second signature of the signatures;

determine a first event from the second machine data based at least in part on the first signature, wherein the first event is associated with the first computing device;

determine a second event from the second machine data based at least in part on the second signature, wherein the second event is associated with the second computing device;

determine a behavioral pattern in real time between the first event and the second event based on a co-occurrence of the first event and the second event within a time window;

determine historical behavior of the information technology environment based at least in part on the determined behavioral pattern; and send at least a portion of the determined historical behavior to a computing system.

9. The one or more non-transitory computer-readable storage media as recited in claim 8, wherein the behavioral pattern is a first behavioral pattern, wherein the one or more sequences of instructions, when executed by the one or more processors further cause the one or more processors to determine an association between the first behavioral pattern and a second behavioral pattern between a third event from the second machine data and a fourth event from the second machine data, wherein the association between the first behavioral pattern and the second behavioral pattern corresponds to the determined historical behavior, wherein to determine the association between the first behavioral pattern and the second behavioral pattern, the one or more sequences of instructions, when executed by the one or more processors further cause the one or more processors to:

identify a timing pattern between the first behavioral pattern and the second behavioral pattern.

10. The one or more non-transitory computer-readable storage media as recited in claim 8, wherein the behavioral pattern is a first behavioral pattern, wherein the one or more sequences of instructions, when executed by the one or more processors further cause the one or more processors to determine an association between the first behavioral pattern and a second behavioral pattern between a third event from the second machine data and a fourth event from the second machine data, wherein the association between the first behavioral pattern and the second behavioral pattern corresponds to the determined historical behavior, wherein to determine the association between the first behavioral pattern and the second behavioral pattern, the one or more sequences of instructions, when executed by the one or more processors further cause the one or more processors to:

identify a timing pattern between the first behavioral pattern and the second behavioral pattern; and measure a statistical frequency of the timing pattern.

11. The one or more non-transitory computer-readable storage media as recited in claim 8, wherein the behavioral pattern is a first behavioral pattern, wherein the one or more sequences of instructions, when executed by the one or more processors further cause the one or more processors to determine an association between the first behavioral pattern and a second behavioral pattern between a third event from the second machine data and a fourth event from the second machine data, wherein the association between the first behavioral pattern and the second behavioral pattern corresponds to the determined historical behavior, wherein to determine the association between the first behavioral pattern and the second behavioral pattern, the one or more sequences of instructions, when executed by the one or more processors further cause the one or more processors to:

identify a timing pattern between the first behavioral pattern and the second behavioral pattern;

measure a statistical frequency of the timing pattern; and determine that the first behavioral pattern and the second behavioral pattern are associated based on the statistical frequency of the timing pattern.

12. The one or more non-transitory computer-readable storage media as recited in claim 8, wherein a first portion of the second machine data produced from the first computing device has a different data format than a second portion of the second machine data produced from the second computing device.

13. The one or more non-transitory computer-readable storage media as recited in claim 8, wherein to determine the first event and to determine the second event, the one or more sequences of instructions, when executed by the one or more processors further cause the one or more processors to:

analyze the second machine data in order to segment the second machine data into the first event associated with the first computing device and the second event associated with the second computing device by determining a beginning and an ending of each of the first event and the second event, each of the first event and the second event including a portion of the second machine data segmented for that event.

14. The one or more non-transitory computer-readable storage media as recited in claim 8, wherein to determine the first event and to determine the second event, the one or more sequences of instructions, when executed by the one or more processors further cause the one or more processors to:
analyze the second machine data in order to segment the second machine data into the first event associated with the first computing device and the second event associated with the second computing device by determining a beginning and an ending of each of the first event and the second event, each of the first event and the second event including a portion of the second machine data segmented for that event; and
associate a time stamp with each of the first event and the second event, the time stamp derived from second machine data segmented for that event.

15. An apparatus, comprising:
one or more processors; and
a memory storing instructions, which when executed by the one or more processors, causes the one or more processors to:
receive first machine data, the first machine data reflecting activity in an information technology environment;
generate signatures from portions of the first machine data;
receive second machine data, the second machine data reflecting activity in the information technology environment;
identify sources of the second machine data using the signatures generated from the portions of the first machine data, wherein the sources include a first computing device associated with a first signature of the signatures and a second computing device associated with a second signature of the signatures;
determine a first event from the second machine data based at least in part on the first signature, wherein the first event is associated with the first computing device;
determine a second event from the second machine data based at least in part on the second signature, wherein the second event is associated with the second computing device;
determine a behavioral pattern in real time between the first event and the second event based on a co-occurrence of the first event and the second event within a time window;
determine historical behavior of the information technology environment based at least in part on the determined behavioral pattern; and
send at least a portion of the determined historical behavior to a computing system.

16. The apparatus as recited in claim 15, wherein the behavioral pattern is a first behavioral pattern, wherein the instructions, when executed by the one or more processors further cause the one or more processors to determine an association between the first behavioral pattern and a second behavioral pattern between a third event from the second machine data and a fourth event from the second machine data, wherein the association between the first behavioral pattern and the second behavioral pattern corresponds to the determined historical behavior, wherein to determine the association between the first behavioral pattern and the second behavioral pattern, the instructions, when executed by the one or more processors further cause the one or more processors to:
identify a timing pattern between the behavioral pattern and the second behavioral pattern.

17. The apparatus as recited in claim 15, wherein the behavioral pattern is a first behavioral pattern, wherein the instructions, when executed by the one or more processors further cause the one or more processors to determine an association between the first behavioral pattern and a second behavioral pattern between a third event from the second machine data and a fourth event from the second machine data, wherein the association between the first behavioral pattern and the second behavioral pattern corresponds to the determined historical behavior, wherein to determine the association between the first behavioral pattern and the second behavioral pattern, the instructions, when executed by the one or more processors further cause the one or more processors to:
identify a timing pattern between the first behavioral pattern and the second behavioral pattern; and
measure a statistical frequency of the timing pattern.

18. The apparatus as recited in claim 15, wherein the behavioral pattern is a first behavioral pattern, wherein the instructions, when executed by the one or more processors further cause the one or more processors to determine an association between the first behavioral pattern and a second behavioral pattern between a third event from the second machine data and a fourth event from the second machine data, wherein the association between the first behavioral pattern and the second behavioral pattern corresponds to the determined historical behavior, wherein to determine the association between the first behavioral pattern and the second behavioral pattern, the instructions, when executed by the one or more processors further cause the one or more processors to:
identify a timing pattern between the first behavioral pattern and the second behavioral pattern;
measure a statistical frequency of the timing pattern; and
determine that the first behavioral pattern and the second behavioral pattern are associated based on the statistical frequency of the timing pattern.

19. The apparatus as recited in claim 15, wherein a first portion of the second machine data produced from the first computing device has a different data format than a second portion of the second machine data produced from the second computing device.

20. The apparatus as recited in claim 15, wherein to determine the first event and the second event, the instructions, when executed by the one or more processors further cause the one or more processors to:
analyze the second machine data in order to segment the second machine data into the first event associated with the first computing device and the second event associated with the second computing device by determining a beginning and an ending of each of the first event and the second event, each of the first event and the second event including a portion of the second machine data segmented for that event; and
associate a time stamp with each of the first event and the second event, the time stamp derived from second machine data segmented for that event.

* * * * *